US011454763B2

(12) United States Patent
Feuchter et al.

(10) Patent No.: US 11,454,763 B2
(45) Date of Patent: Sep. 27, 2022

(54) LIGHT SOURCE ASSEMBLY

(71) Applicant: NKT Photonics A/S, Birkerød (DK)

(72) Inventors: Thomas Feuchter, Holte (DK); Irnis Kubat, Copenhagen N (DK); Timur Iskhakov, Nærum (DK)

(73) Assignee: NKT PHOTONICS A/S, Birkerød (DK)

( * ) Notice: Subject to any disclaimer, the term of this patent is extended or adjusted under 35 U.S.C. 154(b) by 0 days.

(21) Appl. No.: 17/234,361

(22) Filed: Apr. 19, 2021

(65) Prior Publication Data

US 2021/0311257 A1    Oct. 7, 2021

Related U.S. Application Data

(63) Continuation of application No. 16/609,775, filed as application No. PCT/DK2018/050090 on May 2, 2018, now Pat. No. 10,983,281.

(30) Foreign Application Priority Data

May 4, 2017 (DK) .............................. PA 2017 70307

(51) Int. Cl.
*G02B 6/28* (2006.01)
*G02F 1/125* (2006.01)
(Continued)

(52) U.S. Cl.
CPC ............ *G02B 6/2808* (2013.01); *G02F 1/125* (2013.01); *F21S 41/141* (2018.01); *F21S 41/16* (2018.01);
(Continued)

(58) Field of Classification Search
CPC .................................................... G02B 6/2808
See application file for complete search history.

(56) References Cited

U.S. PATENT DOCUMENTS 4,291,940 A ‡ 9/1981 Kawasaki ............ G02B 6/2835
65/408
5,077,814 A ‡ 12/1991 Shigematsu ............ G02B 6/14
385/24
(Continued)

FOREIGN PATENT DOCUMENTS

CN    105051880 A    11/2015
EP    0899837 A1 ‡    3/1999
(Continued)

OTHER PUBLICATIONS

Extended European Search Report dated Dec. 23, 2020, issued by the European Patent Office in corresponding European Application No. 18793843.6-1001, (9 pages).‡
(Continued)

*Primary Examiner* — Vip Patel
(74) *Attorney, Agent, or Firm* — Buchanan Ingersoll & Rooney P.C.

(57) ABSTRACT

A light source assembly having N outputs, the assembly including: a light source arrangement arranged for supplying light to M inputs, where M an N independently of each other are integers and where M≥2 and M≥N; at least one optical couplers, each having at least one input arm and a plurality of output arms; and an integer number, P, of mode scramblers. The light source arrangement may include a broadband light source and a multimode coupler configured for receiving one or more light beams from the light source arrangement, wherein the one or more light beams being derived from the broadband light source and wherein a mode scrambler is arranged for mode scrambling one of said light beams before it enters the multimode coupler.

19 Claims, 11 Drawing Sheets

(51) Int. Cl.
   *F21S 41/24*     (2018.01)
   *F21S 41/16*     (2018.01)
   *F21S 41/141*    (2018.01)
   *F21S 41/20*     (2018.01)
   *G02B 6/43*      (2006.01)

(52) U.S. Cl.
   CPC .............. *F21S 41/24* (2018.01); *F21S 41/285* (2018.01); *G02B 6/43* (2013.01); *G02F 2201/05* (2013.01)

(56)  References Cited

U.S. PATENT DOCUMENTS

| | | | |
|---|---|---|---|
| 6,796,699 B2 ‡ | 9/2004 | Birk | G02B 21/0064 |
| | | | 385/116 |
| 6,963,062 B2 | 11/2005 | Cyr et al. | |
| 9,229,307 B2 ‡ | 1/2016 | Manni | G02B 27/48 |
| 2013/0188251 A1 ‡ | 7/2013 | Kusunose | G02B 21/10 |
| | | | 359/386 |
| 2014/0240951 A1 | 8/2014 | Brady et al. | |
| 2016/0241796 A1 ‡ | 8/2016 | Curreri | H04N 5/2256 |
| 2020/0064551 A1 | 2/2020 | Feuchter et al. | |

FOREIGN PATENT DOCUMENTS

| | | |
|---|---|---|
| EP | 0899837 A1 | 3/1999 |
| WO | 0111343 A1 | 2/2001 |
| WO | WO-0111343 A1 ‡ | 2/2001 |
| WO | 2014130829 A1 | 8/2014 |
| WO | WO-2014130829 A1 ‡ | 8/2014 |
| WO | 2016206700 A1 | 12/2016 |
| WO | WO-2016206700 A1 ‡ | 12/2016 |

OTHER PUBLICATIONS

International Search Report (PCT/ISA/210) and Written Opinion (PCT/ISA/237) dated Aug. 17, 2018, by the Danish Patent Office as the International Searching Authority for International Application No. PCT/DK2018/050090.‡

Office Action (The First Office Action) dated May 26, 2021, by the State Intellectual Property Office of People's Republic of China in corresponding Chinese Patent Application No. 201880041213.5, and an English Translation of the Office Action. (28 pages).

Office Action (Communication pursuant to Article 94(3) EPC) dated Jun. 30, 2022, by the European Patent Office in corresponding European Application No. 18 793 843.6-1020 (7 pages).

Fu, Y. et al."Beam quality factor of mixed modes emerging from a multimode step-index fiber", Optik, vol. 121, No. 5, Mar. 2010, pp. 452-456.

‡ imported from a related application

LIGHT SOURCE ASSEMBLY

CROSS REFERENCE TO RELATED APPLICATIONS

The present application is a continuation of U.S. application Ser. No. 16/609,775, filed on Oct. 31, 2019, which is a U.S. National Stage of International Application No. PCT/DK2018/050090, filed on May 2, 2018, which claims the benefit of Danish Application No. PA 2017-70307, filed on May 4, 2017. The entire contents of each of U.S. application Ser. No. 16/609,775, International Application No. PCT/DK2018/050090, and Danish Application No. PA 2017-70307 are hereby incorporated herein by reference in their entirety.

TECHNICAL FIELD

The invention relates to a light source assembly for supplying light e.g. for illumination and/or sensing purpose(s).

BACKGROUND OF THE INVENTION

In many optical systems it is desired that beams of light may be supplied at several sites simultaneously and/or to deliver light with a desired spectral composition and/or profile.

Use of broadband light sources, such as supercontinuum light sources for illumination and/or sensing purpose is e.g. described in U.S. Pat. No. 6,796,699. The light from the broadband source may e.g. be filtered, such as wavelength filtered and/or polarization filtered prior to being applied for illumination and/or sensing. For some applications it may be advantageous to deliver two or more portions of the light of the broadband light, e.g. several light beams of different wavelength spectra or a beam with a spectrum comprising two or more wavelength peaks for the illumination and/or sensing. A beam with a spectrum comprising two or more wavelengths may include, for example, a first wavelength peak in the range 500-600 nm and a second peak in the range of 700-850 nm.

WO16206700A1 discloses a delivery fiber assembly suitable for delivering broadband light or selected portions thereof to a site for illumination and/or sensing. In an embodiment it is disclosed that portions of the broadband may be filtered off and combined in a fused fiber combiner for being delivered by the delivery fiber.

SUMMARY OF THE INVENTION

The invention may provide a new solution for supplying light, in particular for illumination and/or sensing purposes, such as for calibrating and/or testing light systems.

In an embodiment it is an object to provide a stable and robust light source assembly suitable for supplying light at several sites simultaneously and/or to deliver light with a desired spectral composition and/or profile.

In an embodiment the light source assembly is based on a series of couplers, such as fused fiber couples and at least one in between scrambler for providing a uniform distribution of at least two input beams, such input beams comprising different wavelengths.

In an embodiment the light source assembly comprises a broadband source for delivering selected light portions light to one or more sites of use, where a filter is arranged for filtering off at least one wavelength range, which is scrambled in a scrambler and combined with at least one other light beam in a combiner.

In an embodiment it has been found that by scrambling the input light beam prior to coupling in a fused fiber coupler a very efficient and stable coupling may be achieved while simultaneously the formation of speckle pattern on the output beam is very low or even absent.

It has been found that the invention and/or embodiments thereof have a number of additional advantages, which will be clear to the skilled person from the following description.

Thus it has been found that an effective light distribution to a number of output light portions may be obtained and thanks to the invention light intensity variations between the output light portions may be very low or even absent and thus in an embodiment the output light portions may have essentially equal light intensity.

The term "light" means at least one beam of light and may include two or more beams of light. The phrase "beam of light" and "light beam" are used interchangeably.

The term "light portion" means a portion of the light, such as a portion of the light derived from the light source arrangement. The term "output light portion" is a portion of the light fed to the light source assembly from the light source arrangement and forming an output from the light source assembly.

Unless otherwise specified or clear from the context, the term "substantially" means that ordinary measurement uncertainties, or product variances and tolerances, whichever are larger, are comprised.

The phrase "essentially equal" should herein be taken to mean that variations within measurement tolerances are included.

The term "light intensity," means herein a radiometric quantity, measured in watts per meter squared ($W/m^2$) or $mW/\mu m^2$. The terms power of light and light intensity are used interchangeably unless otherwise specified or clear from the context.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

The terms "core" and "core region" are used interchangeably and the terms "cladding" and "cladding region" are used interchangeably.

The "an embodiment" should be interpreted to include examples of the invention comprising the feature(s) of the mentioned embodiment.

All features of the invention and embodiments of the invention as described herein, including ranges and preferred ranges, may be combined in various ways within the scope of the invention, unless there are specific reasons not to combine such features.

In a first aspect, the light source assembly comprises a number of couplers in optical communication and having inputs and outputs where a light source arrangement is arranged for supplying light to the inputs and output light portions are obtained via the outputs.

In an embodiment of the first aspect, the light source assembly has N outputs, where N is an integer. The light source assembly comprises:

a light source arrangement arranged for supplying light to M inputs, where M is an integer and where M≥2 and M≥N;

a plurality of optical couplers each having at least one input arm and a plurality of output arms; and an integer number, P, of mode scramblers.

In the first aspect it is in an embodiment desired that M>2 and M<N.

The plurality of optical couplers are arranged to divide the light supplied to the M inputs to the N outputs, where each of the N outputs includes light supplied to each of the M inputs.

For at least one of the M inputs there is a respective mode scrambler of the P mode scramblers in the optical communication path between the light source and the at least one of the M inputs, and wherein at least one mode scrambler of the P mode scramblers is arranged in an optical communication path between an output arm of one optical coupler of the plurality of optical couplers and an input arm of a different optical coupler of the plurality of optical couplers.

Thus in the first aspect the light source assembly provides an effective and relatively inexpensive system for evenly distributing light to N outputs. It has been found that, one or more, or even all, of the N outputs may have surprisingly low speckle pattern formation or even no detrimental formation of a speckle pattern. Such formation of speckle pattern is often a problem in prior art illumination systems.

The phrase "no detrimental formation of a speckle pattern" is used to mean that the formation of a speckle pattern is at such low level that it in practice does not influence the use of the light source assembly.

In an embodiment the light source assembly is configured such that for a plurality of the M inputs there is a respective mode scrambler of the P mode scramblers in the optical communication path between the light source arrangement and the respective M inputs. To enhance mode scrambling it may be advantageous that for at least two, such as for all of the M inputs, there is a respective mode scrambler of the P mode scramblers in the optical communication path between the light source assembly and the respective M inputs.

For a cost effective arrangement it is desired that the M inputs are input arms of a first coupler of the optical couplers. In principle, the first coupler may have as many inputs as practically possible. Thus, in an embodiment the higher number of inputs, the longer the coupler requires to be for ensuring an effective coupling. Advantageously, M is from 2 to 10, such as from 2 to 4.

In an embodiment an output arm of the first coupler is in optical communication via an optical communication path with an input arm of a second line coupler of the optical couplers, preferably the optical communication path is the optical communication path comprising the mode scrambler.

The term "second line coupler" is herein used to denote a coupler arranged for receiving light derived from a first or first line coupler. If there is more than one first coupler, each of these is referred to as a first line coupler. In the same way the term "third line coupler" is a coupler receiving light derived from a second line coupler and so forth.

In an embodiment the light source assembly comprises two or more first line couplers.

In an embodiment each of two or more output arms of the first coupler is in optical communication via an optical communication path with an input arm of a second line coupler of the optical couplers. Preferably, each of the optical communication paths comprises a respective mode scrambler of the P mode scramblers. Thereby the light received from the first coupler is once more subjected to mode scrambling and thereby ensuring an even higher uniformity of the light intensity at the N outputs. Advantageously the output arms of the first coupler are in optical communication with input arms of respective second line couplers. Advantageously the second line couplers are substantially identical, i.e. they have substantially equal function.

In an embodiment an output arm of at least one of the second line couplers is in optical communication via an optical communication path with an input arm of a third line coupler of the optical couplers. Preferably, the optical communication path is an optical communication path comprising a respective mode scrambler of the P mode scramblers. Advantageously the output arms of the second coupler are in optical communication with input arms of respective third line couplers.

Advantageously the third line couplers are substantially identical i.e. they have substantially same function. Preferably, each output arm of each second line couplers is in optical communication with a respective input arm of a respective third line coupler.

In an embodiment each of two or more output arms of the second line coupler(s) is in optical communication via an optical communication path with an input arm of a third line coupler of the optical couplers. Preferably, each of the optical communication paths comprises a respective mode scrambler of the P mode scramblers.

In the same or corresponding way, the light source assembly may comprise a number of further line couplers, such as at least one-third line coupler, such as at least one fourth line coupler, such as at least one fifth line coupler. Preferably, respective mode scramblers of the P mode scramblers are in respective optical communication paths between a lower numbered line coupler and a higher numbered line coupler.

In principle, the scramblers may be equal or different from each other. However, generally it is desired that scrambler(s) arranged at the input arm(s) to coupler of same line number are substantially identical, i.e. the scramblers have substantially equal function.

Advantageously the arms of the optical couplers are fiber arms. The optical couplers are preferably fused fiber coupler(s) and/or A×B multimode combiner(s), where A and B independently of each other may be any integer and represent input arms and output arms respectively.

The fused fiber coupler(s) may e.g. be any standard fused couplers, such as the couplers marketed by OZoptics, Canada.

Examples of the A×B multimode combiner are the multimode fiber combiners marketed by Lightcomm Technology of Shenzhen, China. Such multi-mode fiber combiners are generally designed for high power fiber laser application and generally for combining two or more pump lasers into one or more multi-mode output fiber. Such multi-mode fiber combiners may be applied to split the light instead of or after combining light.

The couplers may be individually selected from couplers preferably with m input arms and n output arms. The integers m and n may in principle be as many as practically possible and preferably, m is 1, 2, 3, 4, 5, 6 or 7 and n is 2, 3, 4, 5, 6 or 7.

In principle, the couplers may be equal or different from each other. However, generally it is desired that coupler of same line numbers are substantially identical i.e. they have substantially same function.

Advantageously the couplers comprise at least one 2×2 coupler, optionally all of the remaining couplers are 1×n couplers and n is 2, 3, 4, 5 or 6, preferably 2. The at least one 2×2 coupler is preferably the first coupler.

For effectively dividing the light from the light source arrangement into a relatively high number of output light portions it is desired one or more of the couplers, such as all of the couplers is/are arranged for dividing the input light substantially uniformly with respect to light intensity between its/their output arms, e.g. with a difference of 10% or less, such as of 5% or less, such as of 2% or less difference in light identity relative to the highest light intensity.

Advantageously each of one or more of the couplers is/are multimode couplers comprising multimode arms.

In an embodiment N is at least 4, such as from 5 to 40, such as from 6 to 32, such as from 8 to 16, such as 2 times M.

Advantageously M≤P<N, preferably P is at least 2, such as at least 3. Preferably, P is up to the total number of input arms.

The scramblers may advantageously be selected from a "Step-Graded-Step" mode scrambler and a "Step Index with Bends" mode scrambler. However, in principle any mode scrambler capable of scrambling the light may be applied.

The Step-Graded-Step mode scrambler may for example be an assembly comprising a fusion-spliced concatenation of a step-index profile, a graded-index profile and another step-index profile fiber. Each segment may be from 1 cm to approximately 1 meter long or even longer.

The Step Index with Bend mode scrambler may e.g. be a step-index multimode fiber having a series of small radius bends and/or a fiber that is compressed against surfaces with high roughness.

The light source arrangement of the first aspect comprises at least one light source but it should be understood that the light source arrangement may comprise as many light sources as desired, e.g. an array of LEDs. In an embodiment the light source arrangement optionally comprises two or more laser light sources.

The light source may be narrow banded (e.g. spanning up to about 50 nm) or broad banded (e.g., spanning above 50 nm). In an embodiment the light source arrangement comprises a light source spanning over at least 100 nm, such as at least 500 nm. The light source may comprise a supercontinuum light source. The light source may advantageously span over at least one octave.

The bandwidth or span of a light source is determined to include wavelengths with a spectral intensity of at least 10 µW/nm.

The light from the light source may be pulsed or it may be a continuous light beam.

The light source arrangement may comprise one or more additional optical elements, such as one or more optical filters, one or more amplifiers and/or one or more beam shaping elements. These one or more optical elements may advantageously form part of one or more beam conditioner.

In an embodiment the light source arrangement may comprise a light source selected from a fiber laser, an LED, a solid-state laser, a semiconductor laser or any combinations thereof. The light source arrangement optionally comprises two or more lasers.

In a second aspect the light source assembly comprises a light source arrangement comprising a broadband light source and a multimode coupler configured for receiving one or more light beams from the light source arrangement, wherein the one or more light beams being derived from the broadband light source and wherein a mode scrambler is arranged for mode scrambling one of the light beams before it enters the multimode coupler.

The light source assembly of the second aspect is thus configured for effectively distributing broadband light to obtain a number of output light portions. Thanks to the invention one or more, or all, of the output light portions, may have very low speckle or even no detrimental formation of speckle pattern.

The multimode couplers of the second aspect may be as the couplers described above for the first aspect. In an embodiment the multimode coupler is a multimode fused coupler comprising at least two input arms and at least two output arms.

In an embodiment the multimode coupler or couplers is/are designed as a 50/50 coupler. At least one coupler is preferably a graded index coupler, or a step index coupler, preferably having cores of at least about 100 µm, such as at least about 200 µm.

In an embodiment the light source assembly is configured to provide that at least one of the light beams is derived from the broadband light source and delivered by free space coupling from the light source arrangement to the multimode coupler optionally and preferably via the mode scrambler.

In an embodiment the light source assembly is configured to provide that at least one of the light beams is derived from the broadband light source and is delivered from the light source arrangement at least partly by fiber coupling to the multimode coupler optionally and preferably via the mode scrambler.

The phrase "a light beam derived from a light source" means the entire beam of light from the light source, or any portion thereof, such as a wavelength filtered portion, a polarization filtered portion, and/or a portion derived by any other beam manipulating and/or splitting means. The light beam may e.g. portion of light may e.g. be obtained using a beam conditioner e.g. as described above for the first aspect.

In the second aspect the mode scrambler may be any kind of mode scrambler e.g. as the mode scrambler described for the first aspect. In an embodiment the mode scrambler is a mode scrambling component, such as a non-fiber based mode scrambling component.

In an embodiment the mode scrambler is a fiber mode scrambler. The fiber mode scrambler may be arranged at or forms part of a multimode fiber optically connected to an input arm of the mode scrambler.

In an embodiment the light source assembly is as described for the first aspect above with the condition that the light source assembly comprises at least one broadband light source. Advantageously the broadband light source is configured for generating a broadband light spanning over at least 100 nm, such as at least 500 nm, such as at least 800 nm with a spectral intensity of at least 10 µW/nm. Preferably, the broadband light source is a supercontinuum light source.

The light source arrangement may comprise any kind of beam conditioner. In an embodiment the light source arrangement comprises a wavelength filter for filtering light from the broadband light source to provide a filtered light beam of the one or more light beams derived from the broadband light source. The scrambler is advantageously configured for receiving and scrambling the filtered light beam prior to entering the coupler.

In an embodiment the light source arrangement comprises an optical filter, such as an absorbing glass filter, an interference-based filter with a dielectric coating, a grating, a Fabry-Pérot interferometer, a prism based filter, a band-pass filter, a notch filter and/or any combinations thereof. The light source arrangement may comprise two or more optical filters.

The filter may advantageously be a tunable filter.

In an embodiment the light source arrangement comprises a wavelength filter, such as a band pass filter e.g. an AOTF (acousto-optic tunable filter), the wavelength filter preferably being wavelength tunable. In an embodiment the AOTF is configured for filtering off two or more wavelength ranges from a beam from the broadband source. The light source arrangement may comprise two or more wavelength filters.

In an embodiment the light source arrangement comprises two wavelength filters arranged for filtering off two or more wavelength ranges from an input light beam from the broadband light source. The light source arrangement preferably comprises a beam splitter arranged for splitting the input light beam from the broadband light source in two beam portions, the wavelength filters being arranged for filtering the respective beam portions.

In an embodiment the light source arrangement comprises a wavelength combiner, such as a Wavelength Division Multiplexer (WDM). In an embodiment optionally the wavelength combiner is configured for combining light from one or more wavelength filters and/or unfiltered light from one or more light sources.

A wavelength combiner is also sometimes referred to as a spectral beam combiner or an incoherent beam combiner and is configured for combining beams comprising different wavelengths.

In an embodiment the wavelength combiner is configured for combining two or more high-power laser beams so as to obtain a single beam not only with correspondingly higher power but also with more or less preserved beam quality and thus with increased brightness (power).

In an embodiment the wavelength combiner is configured for combining two or more beams with different (e.g., non-overlapping) optical wavelength spectra, preferably ensuring that the wavelengths propagate in the same direction.

In an embodiment the wavelength combiner is arranged to receive and combine light from two different light sources, such as from two or more diodes, such as from an array of diodes.

In an embodiment the wavelength combiner is arranged to receive and combine light beams having different (e.g., non-overlapping) wavelength spectra, such as light beams from different light sources.

In an embodiment the wavelength combiner is arranged to receive and combine beams from one or more wavelength filters, such as from one wavelength filter arranged to filter light from a supercontinuum light source. For example the wavelength combiner may be arranged to receive and combine beams with different (e.g. non overlapping) wavelength spectra, where the beams are beams from a filtered supercontinuum light source.

For example the broadband source may be a supercontinuum light source and a first filter filtering off a light beam having a first wavelength range and a second filter filtering off a second light beam having second wavelength range and the light source arrangement comprises a combiner arranged for combining the first and the second light beams.

In an embodiment the light source arrangement is configured for filtering light from the broadband light source to provide two or more filtered light beams of the one or more light beams derived from the broadband light source and mode scramblers are arranged for mode scrambling the respective filtered light beams before they enters the multimode coupler.

The various combinations of light sources and/or filters, which may form part of the light source arrangement, ensure a high flexibility of the light source assembly. In particular the combination of a broadband light source and one or more wavelength filters and an optional wavelength combiner is advantageous because the light source assembly may be configured for delivering light having a desired and selected wavelength spectrum, optionally for use for swiping (i.e., scanning) through the spectrum (e.g., for use in a sensing apparatus).

In an embodiment the light source arrangement comprises at least one additional light source arranged for supplying a further light beam to the multimode coupler. The additional light source may be any kind of light source, such as a single mode light source or a multimode light source, a narrow band or a broadband light source. The light source assembly preferably comprises a mode scrambler configured for mode scrambling the further light beam prior to entering the fused coupler.

Advantageously the broadband light source is a single mode light source or a few moded light source. In one embodiment, for example, the light source may have up to 20 guided modes per polarization direction, such as up to 10 guided modes per polarization direction determined at the peak wavelength of the first filtered light beam. Advantageously the broadband light source is a high power light source, e.g. light source having a peak power of 1 kW or more.

The scrambler(s) is/are advantageously configured for increasing the number of excited modes in the one or more light beams derived from the broadband light source. Preferably, the derived and scrambled light beam(s) supplied to the coupler comprises more than 100 modes, such than more than 150 modes.

In an embodiment each of the one or more light beams derived from the broadband light source and scrambled in the mode scrambler has a first beam $M^2$ factor prior to being scrambled in the scrambler and a second beam $M^2$ factor after being scrambled, wherein the second beam $M^2$ factor is larger than the first beam $M^2$ factor, such as at least about 10% larger, such as at least about 50% larger, such as at least about 100% larger or even at least 500% larger.

Thus, the light source assembly ensures a distribution of a light beam with a relatively low $M^2$ factor into several output light portions with substantially equal light intensity.

The $M^2$ factor, also called beam quality factor or beam propagation factor, is a common measure of the beam quality of a laser beam. The beam $M^2$ factor may be determined according to ISO Standard 11146. Thus, it has been found that by lowering the beam quality (increasing the beam $M^2$ factor) of the light source of the light source arrangement, the light intensity the light may be even more evenly distribution at the outputs.

In an embodiment the one or more light beams derived from the broadband light source light beam has/have a bandwidth of up to about 50 nm, such as up to about 20 nm, such as up to about 10 nm, such as up to about 5 nm.

In an embodiment the light beam from at least one of the output arms of the coupler is guided to a further coupler for being split into two or more sub-beams e.g. as described above in the first aspect comprising second line coupler(s) and optionally further line coupler(s).

In an embodiment the multimode coupler comprises a pair of output arms, and the light source assembly further comprises at least two further multimode couplers, each having a pair of input arms and a pair of output arms, one arm of the pair of input arms of each of two of such further multimode couplers is in optical communication with a respective output arm of the pair of output arms of the multimode coupler.

The various features from the light source assembly of the first aspect and of the second aspect may be combined, unless otherwise specified or clear to the skilled person from the context. For example, the light source arrangement of the first aspect may comprise at least one broadband light source.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

The figures are schematic and are not drawn to scale and may be simplified for clarity. Throughout, the same reference numerals are used for identical or corresponding parts.

DETAILED DESCRIPTION

Figure 1A:
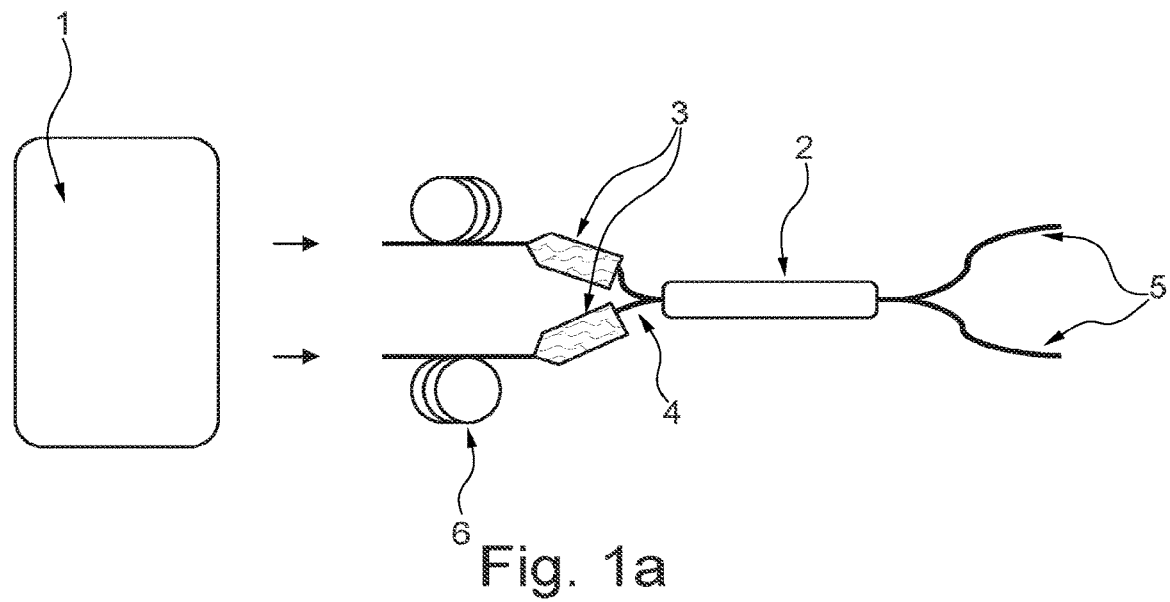
FIG. 1a is a schematic illustration of an embodiment of a light source assembly where the light source arrangement comprises one single light source.

The light source assembly shown in FIG. 1a comprises a light source arrangement 1 a multimode coupler 2 and two mode scramblers 3.

The multimode coupler 2 comprises two input arms 4 and two output arms 5. The mode scramblers 3 are arranged in the optical path between the light source arrangement 1 and the optical arms 4, at the respective input arms 4. The light source arrangement 1 comprises a single light source (not shown) and at least one splitter (not shown) for splitting the light of the light source to deliver two light beams to the respective input arms 4 of the multimode coupler 2. As illustrated, the light beams delivered from the light source arrangement 1 may be delivered fully or partly by fiber 6 to the multimode coupler 2 via the respective mode scramblers 3. In an alternative embodiment one or both of the mode scramblers 3 may be located before, i.e. optically upstream of the fiber 6.

Figure 1B:
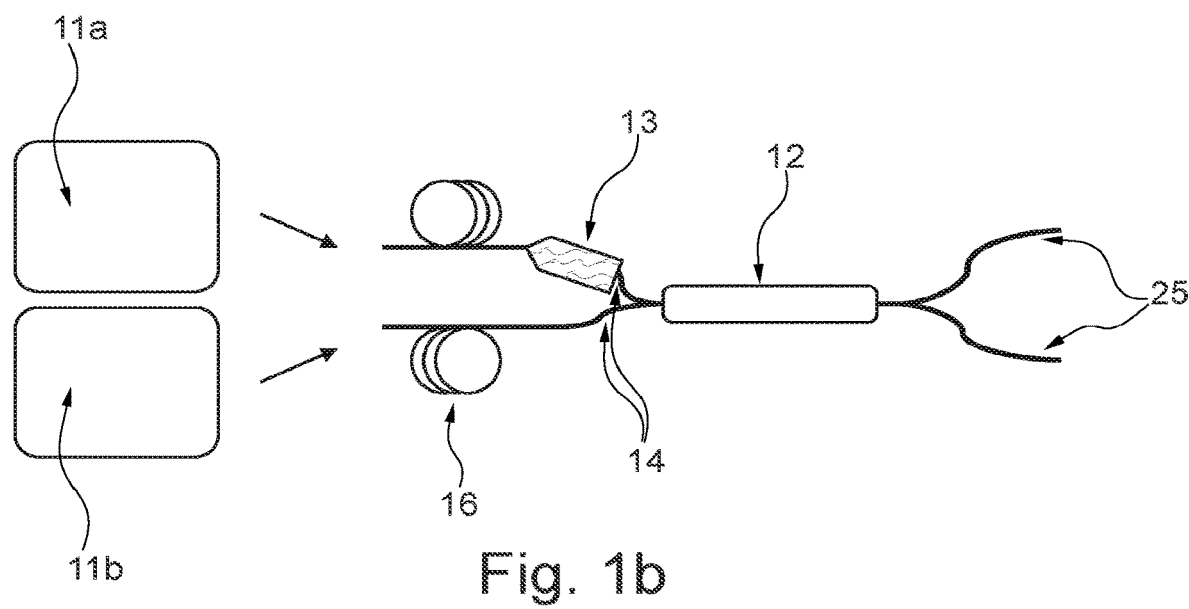
FIG. 1b is a schematic illustration of an embodiment of a light source assembly where the light source arrangement comprises two light sources.

The light source assembly shown in FIG. 1b comprises a light source arrangement, a multimode coupler 12 and a mode scrambler 13.

The multimode coupler 12 comprises two input arms 14 and two output arms 15. The mode scrambler is arranged at one of the input arms 4 whereas no mode scrambler is arranged at the other of the input arms 14.

The light source arrangement comprises a first section 11a with a first light source and a second section 11b with a second light source. The first light source arrangement section 11a is configured for delivering a light beam to the multimode coupler 12 via the input arm comprising the mode scrambler 13.

The second light source arrangement section 11b is configured for delivering a light beam to the multimode coupler 12 via the input arm without a mode scrambler. The first light source may be a single mode or a few moded light source, which when scrambled may increase in $M^2$ value, as well as increase in the number of modes. Advantageously the second light source is configured for delivering a multimode light beam. Preferably, with a higher number of modes, such as 8 or higher. When the light beams are coupled in the multimode coupler 2 the combined light may have a high number of modes for ensuring an even split of light to the output arms 15. As illustrated the light beams delivered from the light source arrangement may be delivered fully or partly by fiber 16 to the multimode coupler 12. In a variation thereof the mode scramblers 13 may be located before, i.e. optically upstream of, the fiber 16.

Figure 1C:
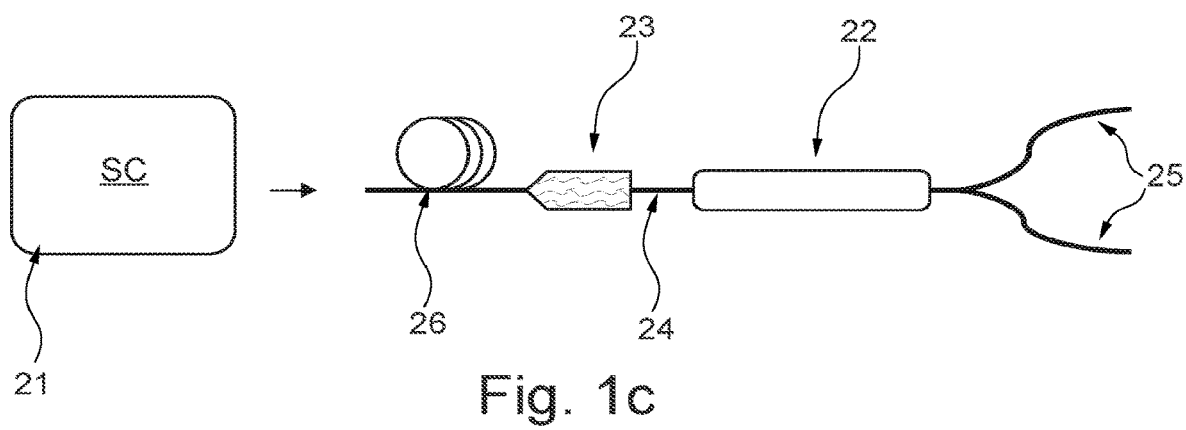
FIG. 1c is a schematic illustration of an embodiment of a light source assembly where the light source arrangement comprises a supercontinuum light source.

The light source assembly shown in FIG. 1c comprises a light source arrangement 21, a multimode coupler 22 and a mode scrambler 23.

The multimode coupler 22 comprises one input arm 24 and two output arms 5. The mode scrambler is arranged at the input arm 24. The light source arrangement 21 comprises a supercontinuum light source and is arranged for delivering a light beam at least partly via fiber 26 to the input arm 24 of the multimode coupler 22. It should be understood that the supercontinuum light source in a variation thereof may be any broadband source.

Figure 1D:
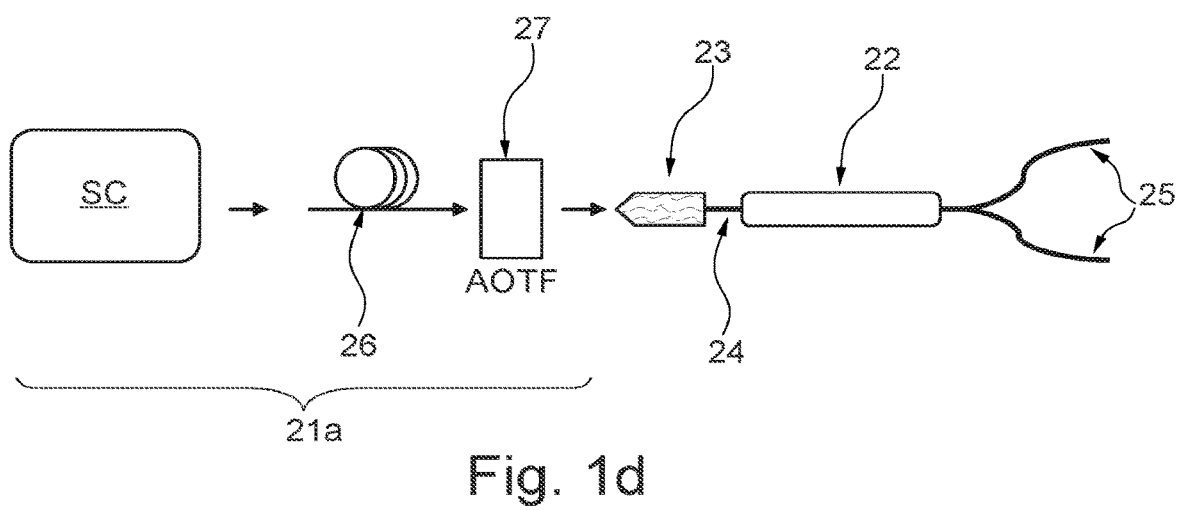
FIG. 1d is a schematic illustration of an embodiment of a light source assembly where the light source arrangement comprises a supercontinuum light source and a wavelength filter.

The light source assembly shown in FIG. 1d differs from the light source assembly of FIG. 1c in that the light source arrangement 21a further comprises a wavelength filter 27, e.g. an AOTF. The AOTF is arranged to receive the light beam from the supercontinuum light source via fiber and/or via free space, for wavelength filtering the received light beam and for delivering the derived light beam to the input arm 24 of the multimode coupler 22 via the mode scrambler 23. The derived beam may be delivered by fiber or by free space.

Figure 1E:
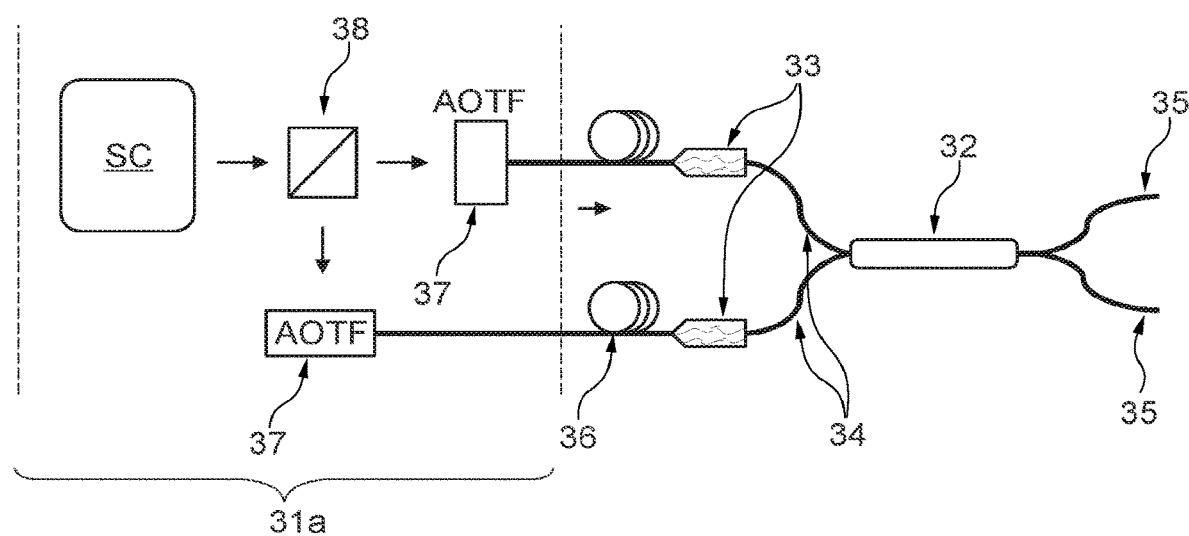
FIG. 1e is a schematic illustration of an embodiment of a light source assembly where the light source arrangement comprises a supercontinuum light source and two wavelength filters.

The light source assembly shown in FIG. 1e comprises a light source arrangement 31, a multimode coupler 32 and two mode scramblers 33.

The multimode coupler 32 comprises two input arms 34 and two output arms 35. The mode scramblers 33 are arranged at the respective input arms 34. The light source arrangement 31 comprises a supercontinuum light source, a splitter 38 and two wavelength filters 37 e.g. AOTFs. The splitter 38 is arranged to split the light from the supercontinuum system in two portions, which may be equal or different. The light beam from the supercontinuum light source may be transmitted via free space to the splitter 38. Each of the AOTFs is arranged to receive one respective portion of light from the splitter and to wavelength filter the received portion of light. The light portions from the splitter 38 may be transmitted via free space to the respective AOTF. The wavelength filtered portions of light are supplied via fibers 36 to the respective arms 34 of the multimode coupler 32 via the respective mode scramblers 33. The AOTF may be configured to filter off corresponding wavelength of light or the AOTF may be configured to be independently tunable. Thereby for example, two different range of wavelengths may be combined in the combiner 32 and split into output portions having substantially equal intensity in the output arms 35.

The light source arrangements 1 11a/11b may comprise one or more supercontinuum light sources.

Figure 2A:
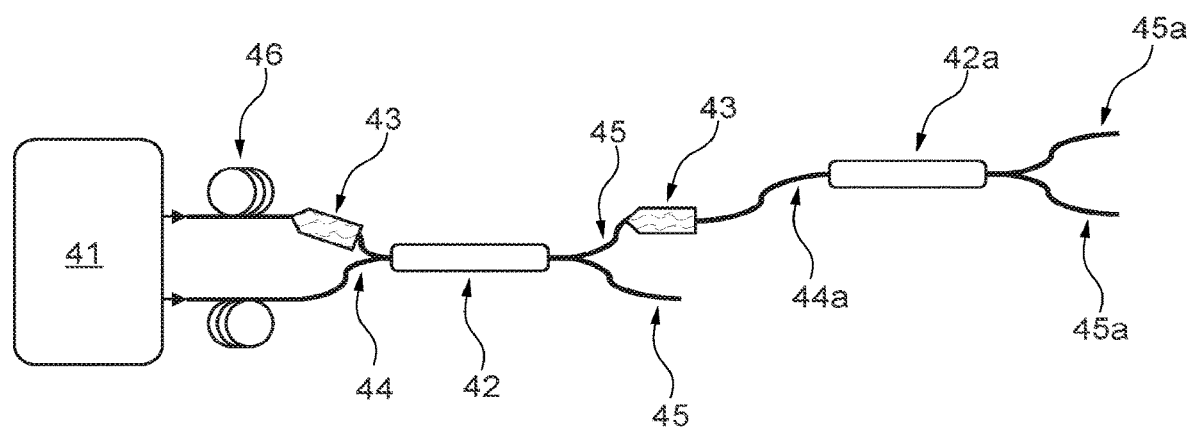
FIG. 2a is a schematic illustration of an embodiment of a light source assembly where the light source arrangement comprises a second line coupler.

The light source assembly shown in FIG. 2a comprises a light source arrangement 41, a first multimode coupler 42, a second line multimode coupler 42a and two mode scramblers 43.

The first multimode coupler 42 comprises two input arms 44 and two output arms 45. The second line multimode coupler 42a comprises one input arm 44a and two output arms 45a.

The light source arrangement may be any of the light source arrangement disclosed above configured for delivering two light beams, one for each of the two input arms 44 of the first multimode coupler 42. One of the light beams of the light source arrangement 41 may be delivered by free space and/or by fiber to a first arm of the first multimode coupler 42 via one of the scramblers 43. The other one of the light beams of the light source arrangement 41 may be delivered by free space and/or by fiber to a second arm of the first multimode coupler 42 without passing any scrambler, or alternatively, may also include a scrambler.

One of the output arms 45 of the first multimode coupler 42 is in optical communication via an optical communication path—here illustrated by a fiber coupling—with the input arm 44a of the second line multimode coupler 42a and the second of the scramblers 43 is arranged in the optical communication path.

The output light portion at the one of the output arms 45 of the first multimode coupler 42 not in optical connection with any second line coupler has an intensity, which is about twice the intensity of the each of the output beams of the respective output arms 45a of the second line multimode coupler 42a.

Figure 2B:
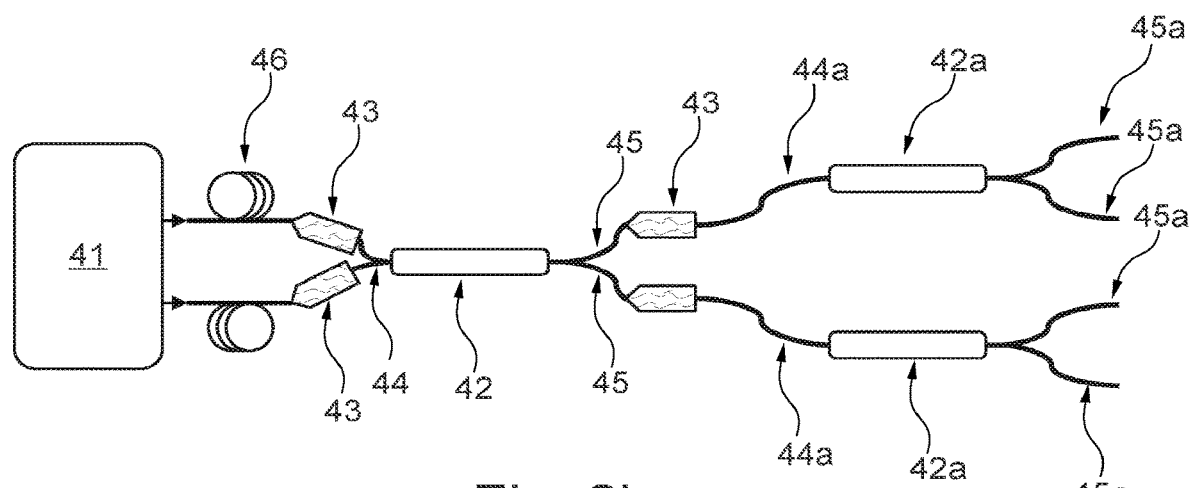
FIG. 2b is a schematic illustration of an embodiment of a light source assembly where the light source arrangement comprises two second line couplers.

The light source assembly shown in FIG. 2b is a variation of the light source assembly of FIG. 2a and differs therefrom in that it comprises further scramblers 33 and a further second line coupler 42a. Thus in the embodiment of FIG. 2a a scrambler 43 is arranged at each of the light path from the light source arrangement 41 to the respective input arms 44 to the first multimode coupler 42 and further each of the output arms 45 of the first multimode coupler 42 is in optical communication via an optical communication path—here illustrated by a fiber coupling—with the input arm 44a of the respective second line multimode couplers 42a and the scramblers 43 are arranged in each of the optical communication paths. The second line multimode couplers 42a are advantageously equal. Thereby the output light portions of each output arm 45a of each second line multimode coupler 44a have substantially equal intensity and may be divided further if desired.

Figure 3:
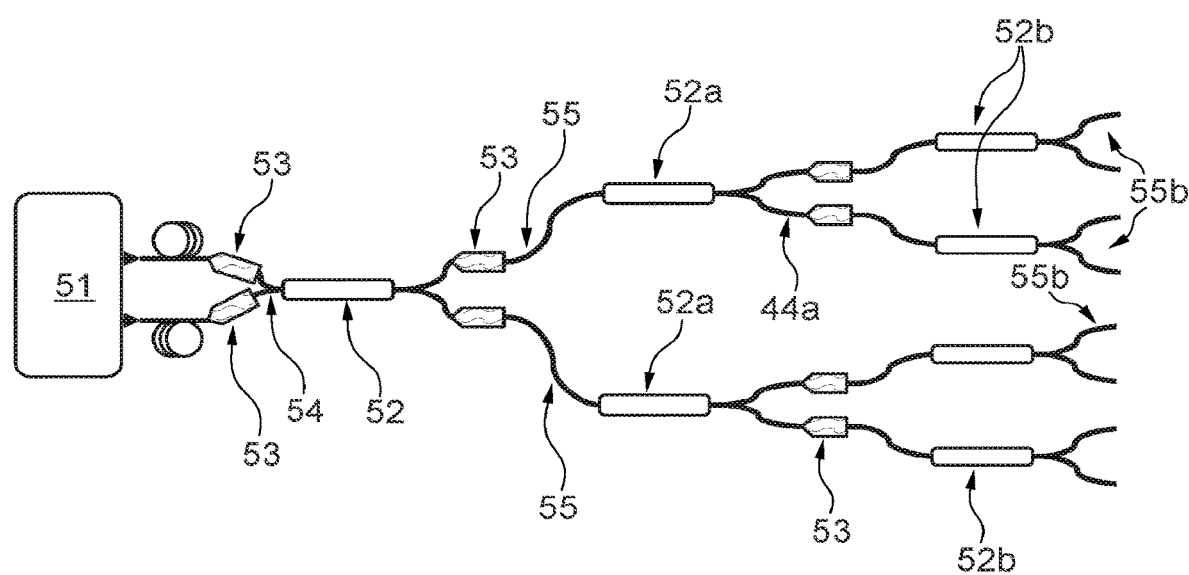
FIG. 3 is a schematic illustration of an embodiment of a light source assembly where the light source arrangement comprises second line and third line couplers.

The light source assembly shown in FIG. 3 comprises a light source arrangement 51, a first multimode coupler 52, two second line multimode couplers 52a, four third line multimode couplers 52b and a plurality of mode scramblers, one arranged in each light path to an input arm of the respective couplers 52, 52a, 52b. In the shown embodiment the first multimode coupler 52 is a 2×2 coupler and each of the second line and third line couplers 52a, 52b are 1×2 couplers. It should be understood that each of the couplers 52, 52a, 52b in variations of the embodiment may have a different number of input and/or output arms. Generally, it is desired that second and higher line couplers have one single input arm.

The light source arrangement 51 may be any of the light source arrangement disclosed above configured for delivering 2 light beams, one for each of the input arms of the first multimode coupler 52. The light may be delivered from the light source 51 to the input arms of the first multimode coupler 52 by fiber and/or via free space.

Each of the second line couplers is arranged for receiving light from an output arm of the first coupler 52 and for delivering light to two third line couplers. By the embodiment of FIG. 3 N outputs 55b may deliver output light portions of substantially equal intensity wherein N is 8.

Figure 4:
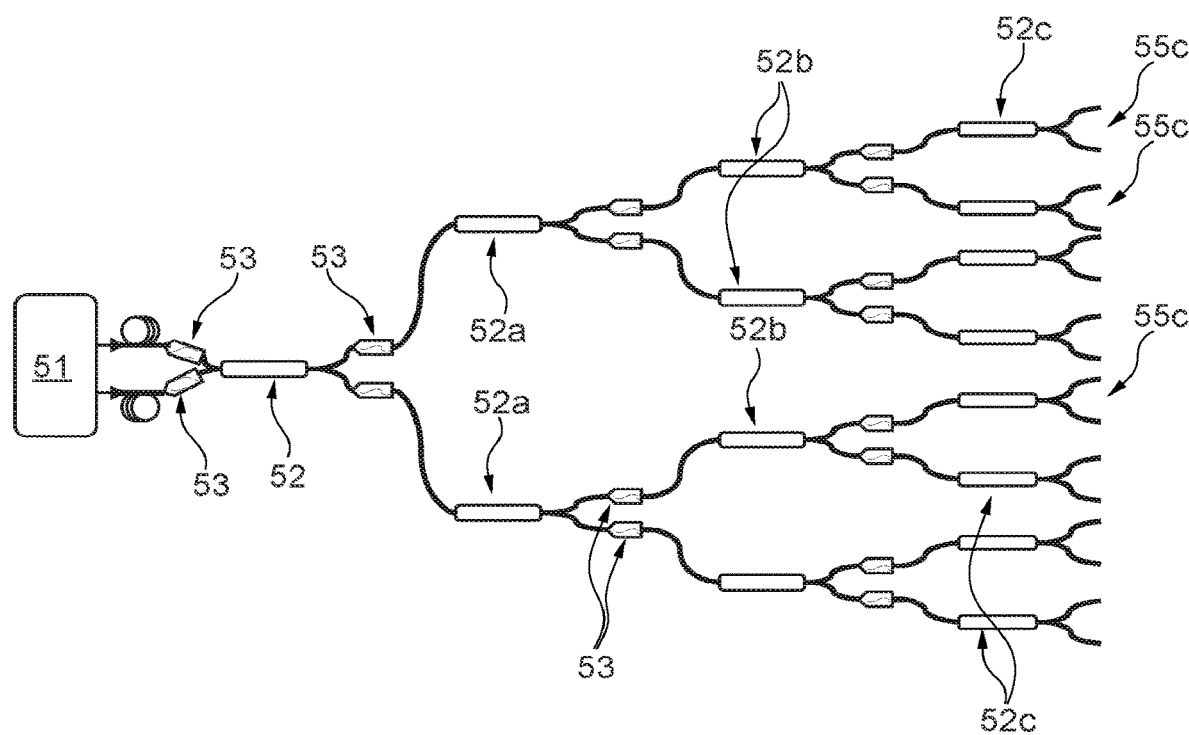
FIG. 4 is a schematic illustration of an embodiment of a light source assembly where the light source arrangement comprises second line, third line and fourth line couplers.

The light source assembly of FIG. 4 is a variation of the light source assembly of FIG. 3 and differs therefrom in that the light source assembly further comprises 8 fourth line multimode couplers 52c each with one input arm and two output arms and where each fourth line multimode coupler 52c is in optical communication via an optical communication path—here illustrated by a fiber coupling—to receive light from an output arm of a third line coupler 52b and wherein a scrambler 53 is arranged in each of the optical communication paths between the third line couplers 52b and the fourth line couplers.

By the embodiment of FIG. 4 N outputs 55c may deliver output light portions of substantially equal intensity wherein N is 16.

Figure 5:
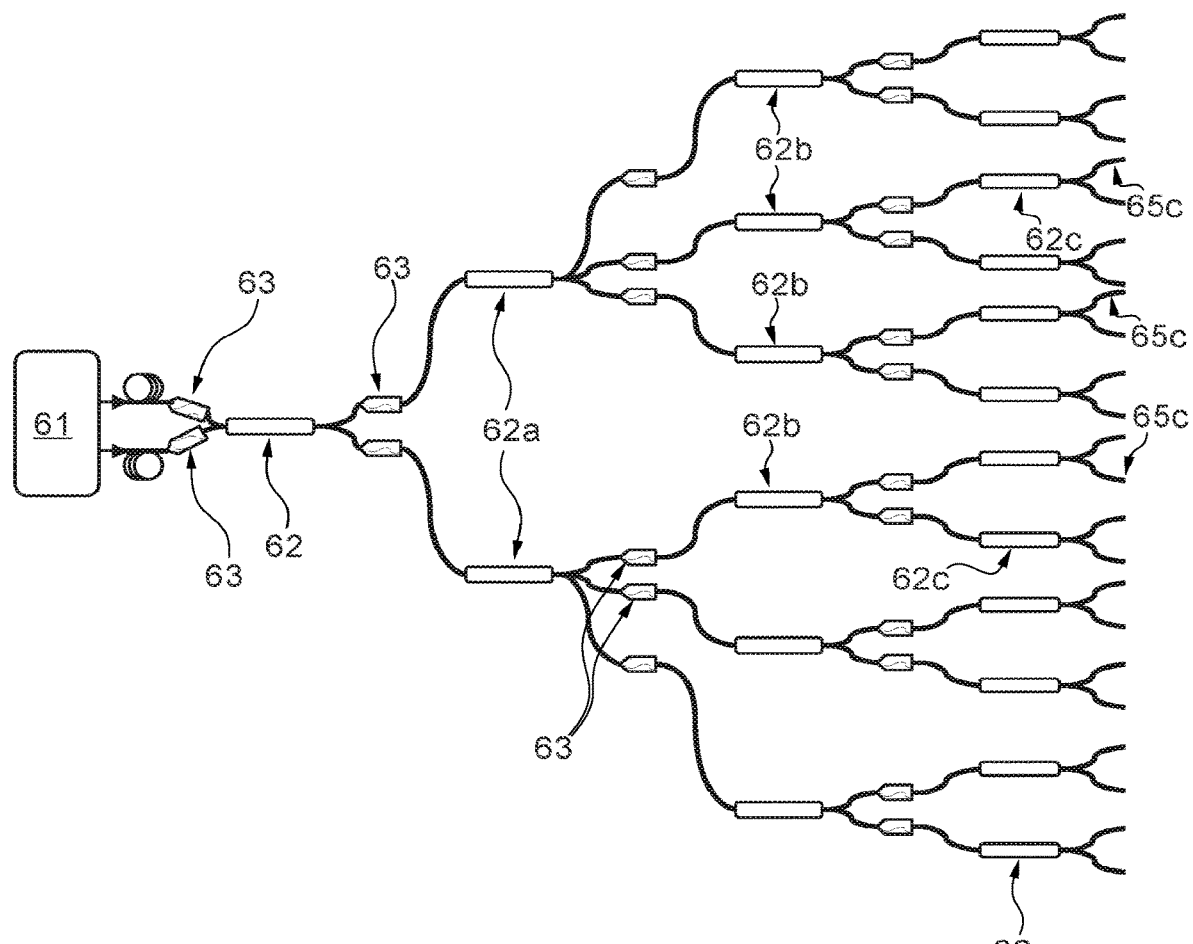
FIG. 5 is a schematic illustration of an embodiment of a light source assembly where the second line couplers differ from the other couplers of the light source assembly.

The light source assembly shown in FIG. 5 comprises a light source arrangement 61, a first multimode coupler 62, two second line multimode couplers 62a, six third line multimode couplers 62b, twelve fourth line multimode couplers 62c and a plurality of mode scramblers 63 one arranged in each light path to an input arm of the respective couplers 62, 62a, 62b, 62c. In the shown embodiment the first multimode coupler 62 is a 2×2 coupler the two second line coupler are 2×3 couplers and each of the third line and fourth line couplers 62b, 62c are 1×2 couplers.

The light source arrangement 61 may be any of the light source arrangement disclosed above configured for delivering 2 light beams, one for each of the input arms of the first multimode coupler 62. The light may be delivered from the light source 61 to the input arms of the first multimode coupler 62 by fiber and/or via free space.

Each of the second line couplers 62a is arranged for receiving light from an output arm of the first coupler 62 and for delivering light to the respective input arms of three of the third line couplers 62b. Each third line coupler 62b is arranged for receiving light from an output arm of a second line coupler 62a and for delivering light to the respective input arms of two of the fourth line couplers 62c.

By the embodiment of FIG. 5 N outputs 65c may deliver output light portions of substantially equal intensity wherein N is 24.

Figure 6:
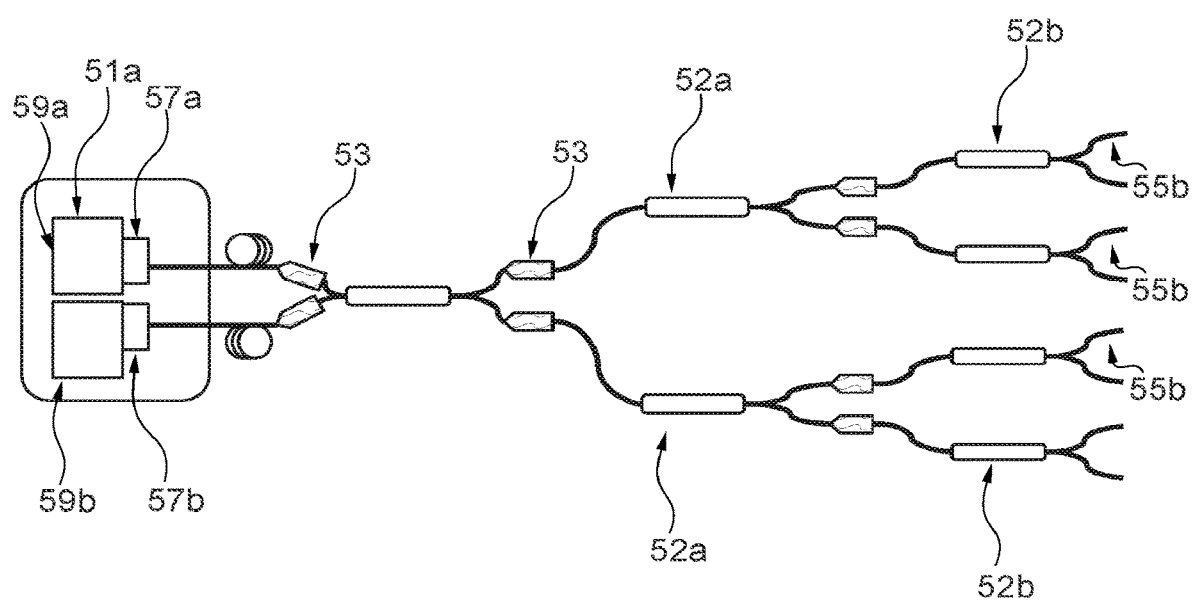
FIG. 6 is a schematic illustration of an embodiment of a light source assembly, which is a variation of the light source assembly of FIG. 3.

The light source assembly shown in FIG. 6 is a variation of the embodiment of FIG. 3 and differs therefrom in that the light source arrangement 51a comprises a first and a second light source 59a, 59b and a first and a second filter 57a, 57b arranged for filtering the light of respectively the first and the second light source 59a, 59b. The first and the second light source 59a, 59b may be equal or different e.g. at least one of them may be a broadband light source. The first and the second filter 57a, 57b may be substantially the same or different and preferably include at least one tunable wavelength filter.

Figure 7:
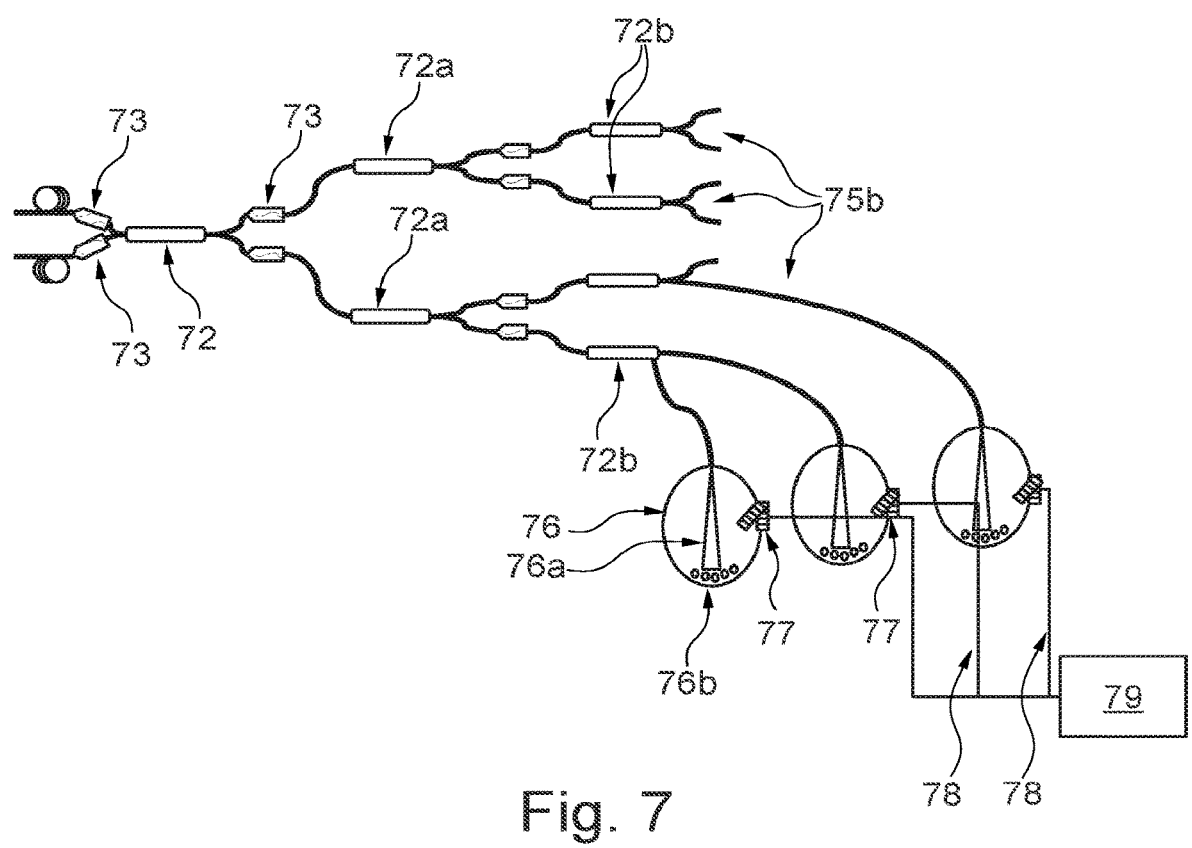
FIG. 7 is a schematic illustration of an embodiment of a light source assembly configured for supplying light at spatially discrete sites for illumination and/or sensing purpose.

FIG. 7 shows a light source assembly comprising, a first multimode coupler 72, two second line multimode couplers 72a, four third line multimode couplers 72b and a plurality of mode scramblers 73, one mode scrambler 73 arranged in each light path to an input arm of the respective couplers 72, 72a, 72b. A light source arrangement (not shown) is arranged to supply light to each of the input arms of the first multimode coupler 72.

The light source assembly has M inputs provided by the input arms of the first multimode coupler 72, so here M is 2. The light source assembly has N outputs provided by the output arms 75b of the third line multimode couplers 72b, so here N is 8.

The light source assembly is arranged for illumination and sensing of pellets 76b in sensing chambers 76. Each of the N outputs delivers an output light portion of essentially equal intensity. The respective output light portion of the N outputs may be supplied at the spatially discreetly arranged sensing chambers 76 for projecting illuminating beams 76a towards the pellets 76b for sensing one or more characteristics of the pellets, such as color, content, structure and etc.

A light sensor, such as a camera 77 is arranged in each sensing chamber 76 to image light reflected from the pellets 76b and the image data from the respective light sensors 77 are transmitted via wires 78 to a data analyzer 79. The light system may e.g. be arranged for supplying illumination for hyperspectral sensing as described in the PhD thesis by Otto Abildgaard "Broadband optical characterization of material properties". DTU Compute PHD-2014; No. 334, DOI: 10.11581/DTU:00000009.

In an embodiment the pellets comprise pills and the detector system is arranged for detecting if the coating on the pills fulfills one or more quality parameters. The sensing chamber 76 may comprise a pill coater.

Figure 8:
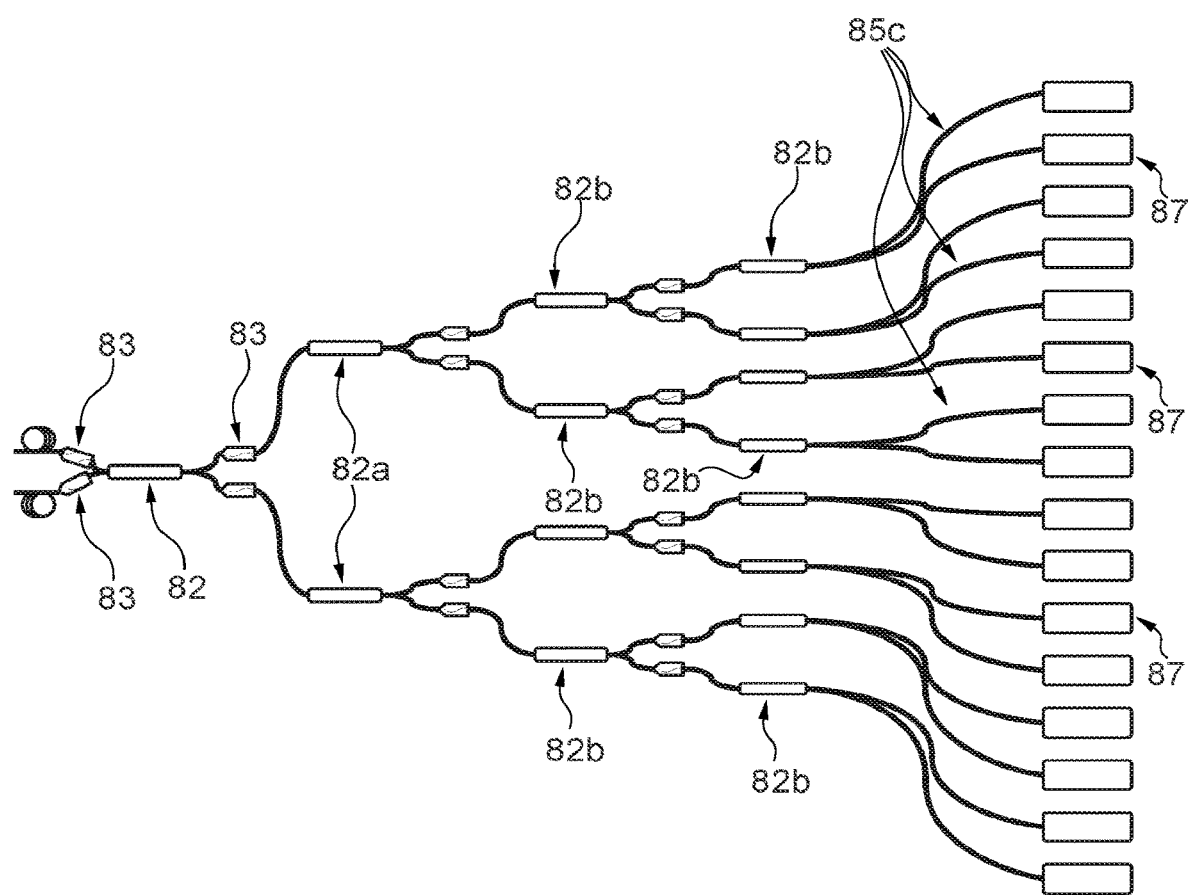
FIG. 8 is a schematic illustration of an embodiment of a light source assembly configured for supplying light at a high number of spatially discrete sites for illumination and/or sensing purpose.

FIG. 8 shows a light source assembly comprising, a first multimode coupler 82, two second line multimode couplers 82a, four third line multimode couplers 82b, eight fourth line multimode couplers 82c and a plurality of mode scramblers 83, one mode scrambler 83 arranged in each light path to an input arm of the respective couplers 82, 82a, 82b, 82c.

A not shown light source arrangement is arranged to supply light to each of the input arms of the first multimode coupler 82.

The light source assembly has M inputs provided by the input arms of the first multimode coupler 82, so here M is 2. The light source assembly has N outputs provided by the output arms 85c of the fourth line multimode couplers 82c, so here N is 16.

With reference to the above discussed figures and embodiments, it is noted that one or more, including all, of the output arms 5 (FIG. 1a), output arms 25 (FIGS. 1b-1d), output arms 35 (FIG. 1e), output arms 45a (FIGS. 2a, 2b), output arms 55b (FIGS. 3, 6), output arms 55c (FIG. 4), output arms 65c (FIG. 5), output arm 75b (FIG. 7) and output arms 87 (FIG. 8) may be in optical communication with a mode scrambler, e.g., with a mode scrambler that receives light from the optical arm, such as by be positioned at the output of the optical arm.

The light source assembly is arranged for illumination for supplying light at spatially discrete sites for illumination, e.g. for vehicle lights. Each of the N outputs delivers an output light portion of essentially equal intensity. The respective output light portion of the N outputs may be supplied at the spatially discreetly arranged lights 87 which may e.g. include left headlight, right head light, left rear light and etc.

Figure 9A:
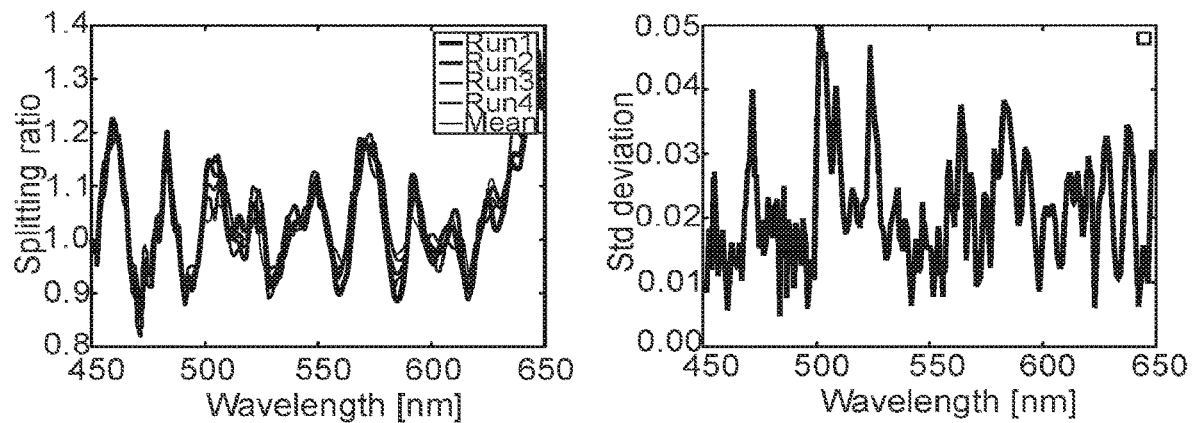
FIG. 9a show the splitting ratio of a standard 1×2 splitter and standard deviation thereof.

The left-hand side of FIG. 9a shows the splitting ratio as a function of wavelength of a standard 1×2 splitter. Four runs of light were supplied to the splitter and the output light power of one of the output arms as well as the average (mean) was plotted. As seen, the variation between the runs and mean is quite substantial which is a clear indication of a high speckle pattern formation. The right-hand side of FIG. 9a shows the standard deviation as a function of wavelength and confirms that there is a high degree of speckle patter formation.

Figure 9B:
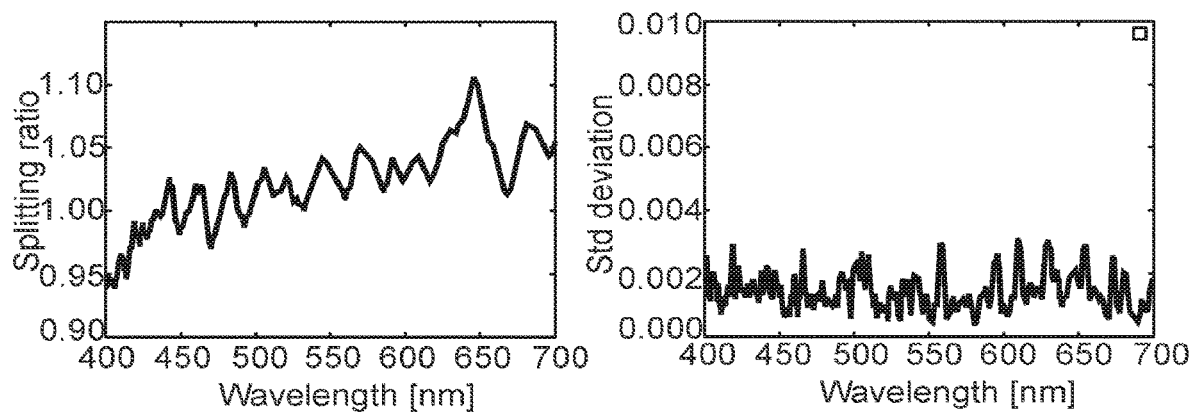
FIG. 9b show the splitting ratio of a first coupler of an embodiment of the light source assembly and standard deviation thereof.

The left-hand side of FIG. 9b shows the splitting ration as a function of wavelength of a first coupler of an embodiment of the light source assembly. Four runs of light were supplied to the splitter and the output light power of one of the output arms as well as the average (mean) was plotted. As seen, the variation between the runs and mean is very small, which is a clear indication of a very low speckle pattern formation. The right side of FIG. 9b shows the standard deviation as a function of wavelength and confirms that there is a very low degree of speckle pattern formation.

The invention claimed is:

1. A light source assembly comprising a light source arrangement comprising a broadband light source and a multimode coupler configured for receiving one or more light beams from the light source arrangement, wherein the one or more light beams are derived from the broadband light source and wherein a mode scrambler is arranged for mode scrambling one of said light beams before it enters the multimode coupler, wherein each of the one or more light beams derived from the broadband light source and scrambled in the mode scrambler has a first beam $M^2$ factor prior to being scrambled in the mode scrambler, and wherein the mode scrambler is arranged for mode scrambling to increase the first beam $M^2$ factor to a second beam $M^2$ factor, larger than the first beam $M^2$ factor.

2. The light source assembly of claim 1, wherein the multimode coupler is a multimode fused coupler comprising at least two input arms and at least two output arms.

3. The light source assembly of claim 1, wherein the mode scrambler comprises a mode scrambling component.

4. The light source assembly of claim 3, wherein the mode scrambling component is a non-fiber based mode scrambling component.

5. The light source assembly of any claim 1, wherein said broadband light source comprises a few moded light source with up to 20 guided modes per polarization direction determined at a peak wavelength of the first filtered light beam.

6. The light source assembly of claim 1, wherein said light source arrangement comprises a wavelength tunable filter for filtering light from the broadband light source to provide a filtered light beam of the one or more light beams derived from the broadband light source, said scrambler being configured for receiving and scrambling said filtered light beam prior to entering the multimode coupler, wherein said wavelength tunable filter is configured for filtering off two or more wavelength ranges from an input light beam from the broadband light source.

7. The light source assembly of claim 6, wherein said wavelength filter is an acousto-optic tunable filter.

8. The light source assembly of claim 1, wherein said multimode coupler comprises a 50/50 coupler.

9. The light source assembly of claim 8, wherein said multimode coupler comprises a 50/50coupler having cores of at least about 100 pm.

10. The light source assembly of claim 8, wherein said multimode coupler comprises a 50/50coupler having cores of at least about 200 pm.

11. The light source assembly of claim 8, wherein said coupler is a graded index coupler.

12. The light source assembly of claim 8, wherein said coupler has cores of at least about 100 pm.

13. The light source assembly of any claim 1, wherein said scrambler is configured for increasing a number of excited modes in the one or more light beams derived from the broadband light source, and said derived and scrambled light beam(s) supplied to said coupler comprises more than 100 modes.

14. The light source assembly of claim 1, wherein the second beam $M^2$ factor is at least 10% larger than the first beam $M^2$ factor.

15. The light source assembly of any claim 1, wherein said one or more light beams derived from the broadband light source light beam has/have a bandwidth of up to about 50 nm.

16. The light source assembly of claim 2, wherein the light beam from at least one of the output arms of the multimode coupler is guided to a further coupler for being split into two or more sub-beams.

17. The light source assembly of claim 1, wherein said broadband light source comprises a few moded light source with up to 10 guided modes per polarization direction determined at a peak wavelength of the first filtered light beam.

18. The light source assembly of claim 1, wherein the second beam $M^2$ factor is at least 100% larger than the first beam $M^2$ factor.

19. The light source assembly of claim 1, wherein the second beam $M^2$ factor is at least 500% larger than the first beam $M^2$ factor.

* * * * *